(12) United States Patent
Miura

(10) Patent No.: US 9,445,085 B2
(45) Date of Patent: Sep. 13, 2016

(54) IMAGING APPARATUS, METHOD FOR CONTROLLING IMAGING APPARATUS, AND SYSTEM THEREFOR

(71) Applicant: CANON KABUSHIKI KAISHA, Tokyo (JP)

(72) Inventor: Hiroya Miura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 14/279,099

(22) Filed: May 15, 2014

(65) Prior Publication Data

US 2014/0340526 A1 Nov. 20, 2014

(30) Foreign Application Priority Data

May 17, 2013 (JP) .................................. 2013-105459
May 17, 2013 (JP) .................................. 2013-105460

(51) Int. Cl.
*H04N 17/02* (2006.01)
*H04N 17/00* (2006.01)

(52) U.S. Cl.
CPC .................................. *H04N 17/002* (2013.01)

(58) Field of Classification Search
USPC ................................................ 348/175, 181
See application file for complete search history.

(56) References Cited

U.S. PATENT DOCUMENTS

2012/0098975 A1* 4/2012 Chao et al. .................. 348/187
2012/0105648 A1* 5/2012 Kim et al. .................... 348/175

FOREIGN PATENT DOCUMENTS

JP 2013-055395 A 3/2013

* cited by examiner

*Primary Examiner* — Michael Teitelbaum
(74) *Attorney, Agent, or Firm* — Canon U.S.A., Inc. IP Division

(57) ABSTRACT

An imaging apparatus includes an imaging unit having a predetermined pixel array, and a generation unit configured to generate a test video signal for evaluating consistency between a video signal generated by performing predetermined processing on a video signal output from the imaging unit, and the video signal output from the imaging unit. In the test video signal, a signal value of each pixel is set so as to exhaustively cover signal values within a predetermined range in a direction in a video image of the test video signal. The test video signal has a repetition pattern in the direction in the video image of the test video signal. A signal deviating from regularity of the repetition pattern is inserted at a predetermined position in the repetition pattern. The spatially or temporally adjacent repetition patterns have different phases from each other.

14 Claims, 13 Drawing Sheets

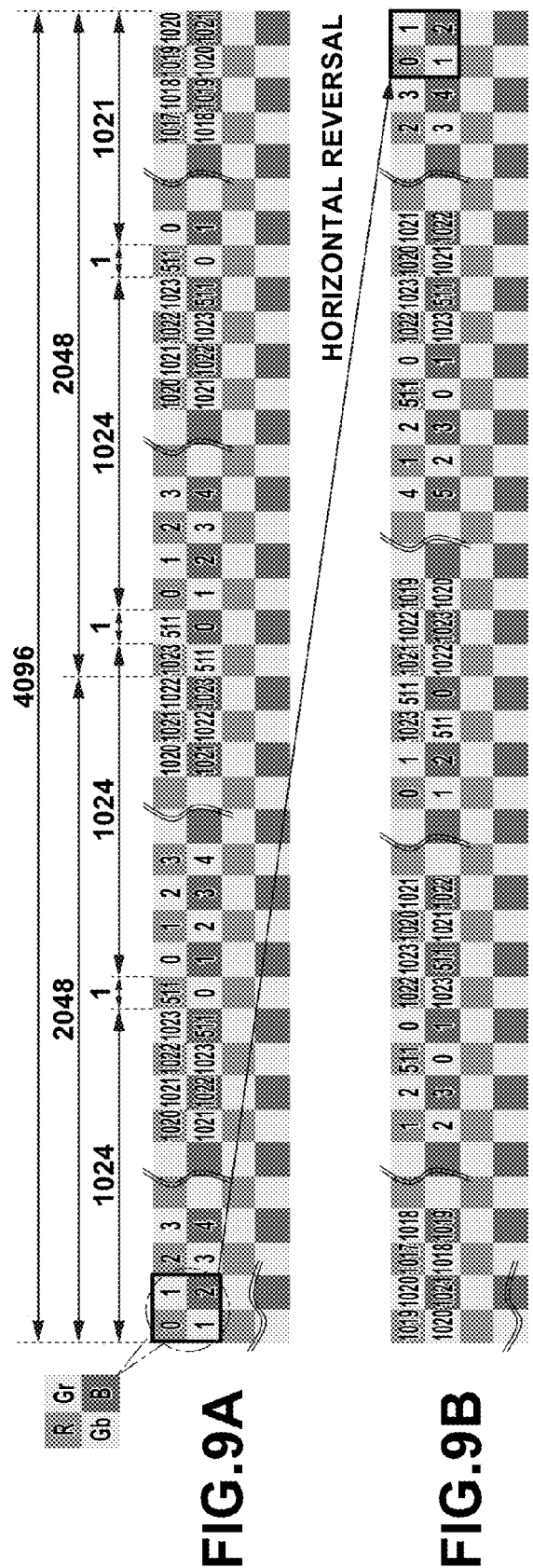

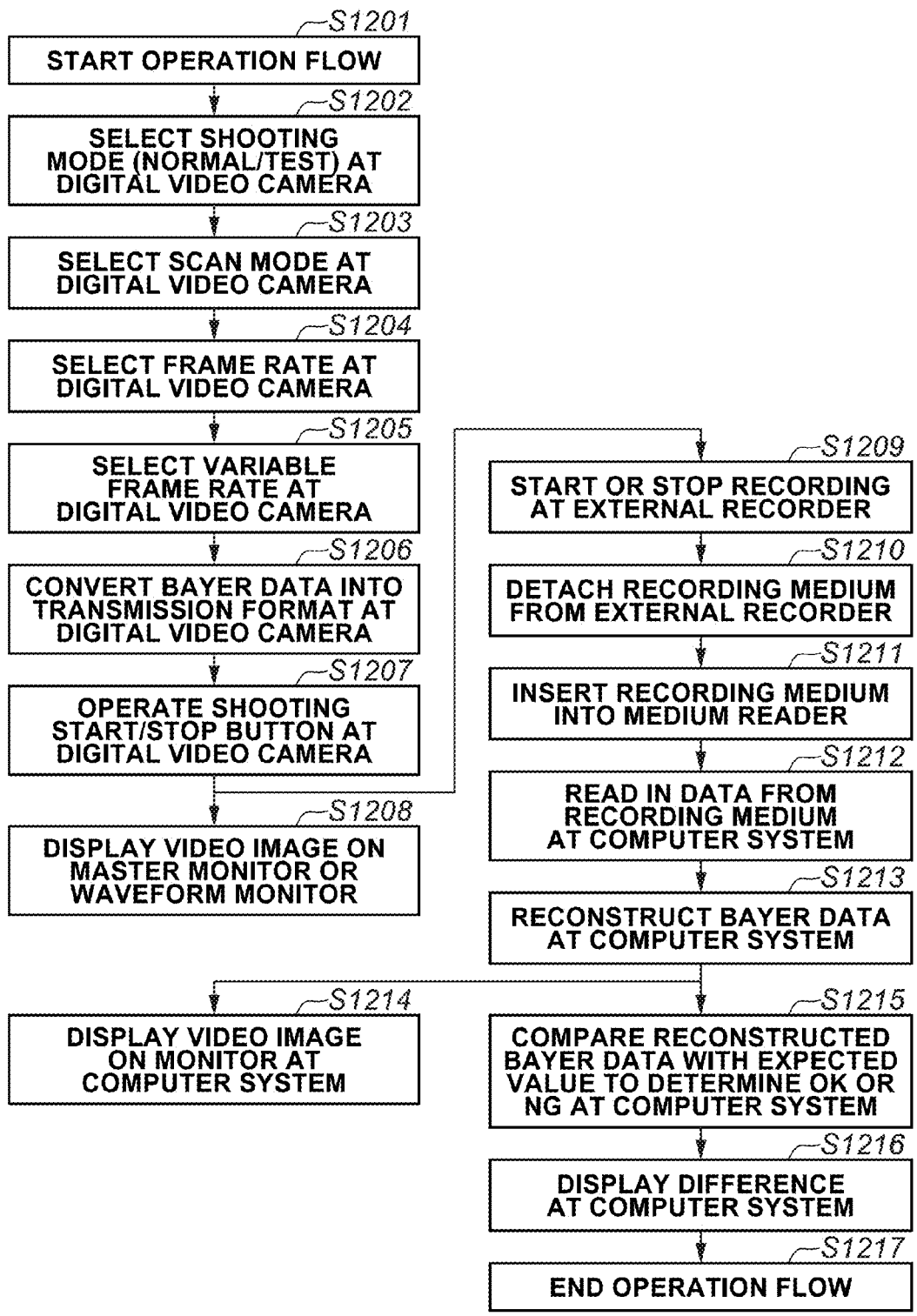

IMAGING APPARATUS, METHOD FOR CONTROLLING IMAGING APPARATUS, AND SYSTEM THEREFOR

BACKGROUND OF THE INVENTION

1. Field of the Invention

The present invention relates to an imaging apparatus, a method for controlling an imaging apparatus, and a system therefor, and, in particular, to an imaging apparatus having a function of generating video data in consideration of transfer of a video signal, a method for controlling an imaging apparatus, and a system.

2. Description of the Related Art

Conventionally, in capturing and recording of a video image by a digital video camera, the video image has been recorded in a recording medium in the camera, or has been recorded in a recording medium of an external recorder. An output according to Institute of Electrical and Electronics Engineers (IEEE) 1394 or an output according to High-Definition Multimedia Interface (HDMI (registered trademark)) is used in connecting with the external recorder. Further, for example, an output according to Serial Digital Interface (SDI) established by Society of Motion Picture and Television Engineers (SMPTE) is also used.

Some of cameras for professional use include a Bayonet Neill Concelman (BNC) terminal (a bayonet connector), and can handle the output according to SDI. These cameras present a display on an external monitor by connection of a coaxial cable to the BNC terminal. Moreover, an external recorder apparatus capable of receiving a video signal, audio data, and a control code transmitted according to an SMPTE format is also used in recording, if necessary.

Further, there are cameras capable of outputting not only Red-Green-Blue (RGB) data and Luminance-Chroma Blue-Chroma Red (YCbCr) data after an output from an image sensor is developed, which are readily usable as an imaged material, but also data before development (hereinafter referred to as RAW data for convenience of a description), which depends on the output from the image sensor, as video data. Japanese Patent Application Laid-Open No. 2013-55395 discusses a system including such a camera, an external recorder configured to receive RAW data output from the camera and record it in a predetermined format, and a processing apparatus configured to develop the recorded data (e.g., the external recorder itself and a personal computer (PC)), and the like.

In the above-described context, the RAW data based on a pixel array of the image sensor, which is output from the image sensor of the camera, is subjected to predetermined processing in the camera, is transmitted to the external recorder via a transmission path, and is recorded by the recorder. Then, the recorded RAW data is developed. In such a case, a problem of consistency may arise between the RAW data output from the image sensor and the externally recorded RAW data.

SUMMARY OF THE INVENTION

The present invention is directed to providing an imaging apparatus, a method for controlling an imaging apparatus, and a system therefor, in a system configured to capture, record, and process a video image, in which consistency can be confirmed between a video signal in a predetermined format that is output from an imaging unit, and a video signal at each unit of the system.

According to an aspect of the present invention, an imaging apparatus includes an imaging unit having a predetermined pixel array, and a generation unit configured to generate a test video signal for evaluating consistency between a video signal generated by performing predetermined processing on a video signal output from the imaging unit, and the video signal output from the imaging unit. In the test video signal, a signal value of each pixel is set so as to exhaustively cover signal values within a predetermined range in an arbitrary direction in a video image of the test video signal. The test video signal has a repetition pattern in the arbitrary direction in the video image of the test video signal. A signal deviating from regularity of the repetition pattern is inserted at a predetermined position in the repetition pattern. The spatially or temporally adjacent repetition patterns have different phases from each other.

Further features of the present invention will become apparent from the following description of exemplary embodiments with reference to the attached drawings.

BRIEF DESCRIPTION OF THE DRAWINGS

FIGS. 9A to 9E illustrate examples of output formats of a test video signal from a digital video camera as an example of an imaging apparatus according to a fifth exemplary embodiment of the present invention.

FIG. 12 illustrates an example of a verification workflow utilizing the test video signals according to the respective exemplary embodiments.

DESCRIPTION OF THE EMBODIMENTS

Various exemplary embodiments, features, and aspects of the invention will be described in detail below with reference to the drawings.

In the following description, the present invention will be described in detail according to effective and exemplary embodiments with reference to the drawings.

A digital video camera having a function of generating a video signal will be described as an example of a video signal processing apparatus according to a first exemplary embodiment of the present invention. However, the present invention can be applied to any video processing apparatus having a function of generating a video signal and outputting this video signal. Examples of such an apparatus include a digital video camera for a broadcast station or another processional use, a digital still camera, a portable information terminal equipped with a camera, a mobile phone equipped with a camera, various kinds of test signal generators, a video recording apparatus, a video playback apparatus, and the like.

Figure 1:
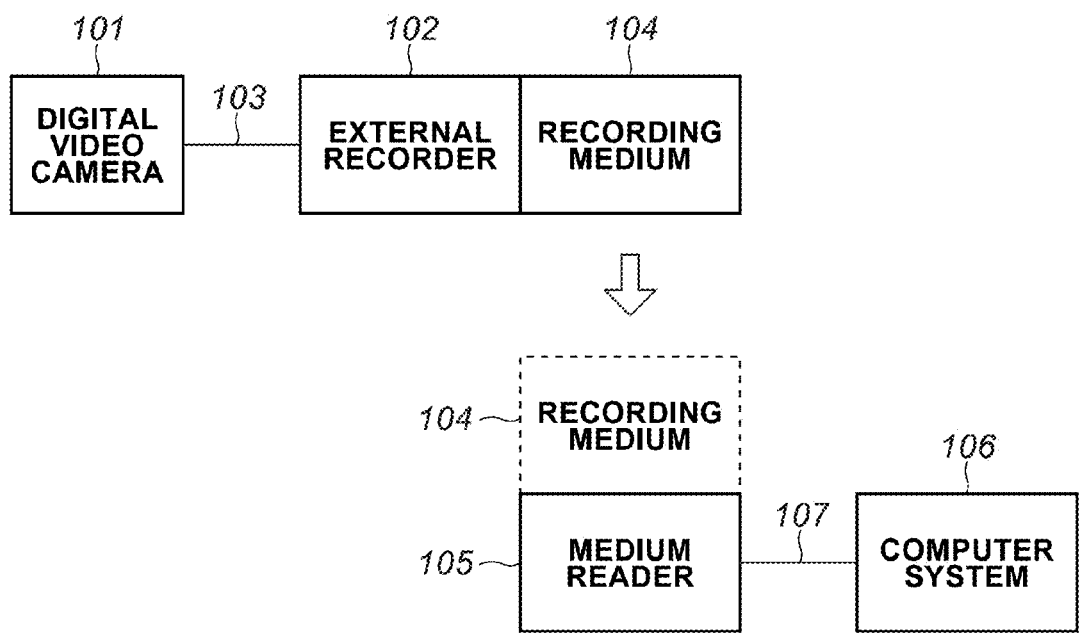
FIG. 1 illustrates an example of a workflow when a video image from a digital video camera according to exemplary embodiments of the present invention is recorded by an external recorder.

First, FIG. 1 illustrates an example of a configuration of a system including a digital video camera 101, an external recorder 102, a transmission path 103, a recording medium 104, a medium reader 105, and a computer system 106.

Referring to FIG. 1, the digital video camera 101 includes an imaging unit, and an image processing unit capable of digitally outputting imaged and digitized RAW data to the transmission path 103 according to a predetermined format.

The external recorder 102 is an apparatus capable of receiving the RAW data of the video image transmitted via the transmission path 103 and recording the received RAW data into the recording medium 104.

In the present example, the transmission path 103 is a path based on three gigabits per second (3G)-SDI, which is defined by SMPTE 424 and SMPTE 425.

The recording medium 104 is a medium that is connected to the external recorder 102 and stores video data. The recording medium 104 is often used for making striping access to a plurality of solid state drives (SSDs), which allow high-speed access thereto, to handle recording of video data having a large volume at a high resolution.

The medium reader 105 is often connected to the computer system 106 via a high-speed interface such as Universal Serial Bus (USB), external Serial Advanced Technology Attachment (eSATA), Serial Attached SCSI (SAS) (SCSI stands for Small Computer System Interface), Thunderbolt, or the like. The recording medium 104 is detached from the external recorder 102, and is then attached to the medium reader 105, which allows the computer system 106 to read in the recorded video data.

The computer system 106 includes a signal processing system, a recording medium, an operation system, a display unit, and an interface that connects to the medium reader 105. Generally, the computer system 106 executes a dedicated application and reads in the video data from the recording medium 104 connected to the medium reader 105, and can develop the RAW data of the read video image. For example, in the development, the computer system 106 performs Debayer processing (interpolation processing or the like) for converting R, Gr, Gb, and B data of Bayer RAW data into RGB plain data. The interpolation processing is realized by various algorithms, and their superiority and inferiority affect sharpness, a false color generated at an edge boundary, a quality around a high luminance point, and the like.

A digital interface 107 may be USB, eSATA, SAS, Thunderbolt, or the like. It is desirable that the digital interface 107 can function at a high speed as an interface standard, but its capability also depends on performances of a central processing unit (CPU) and a storage device of the computer system 106 used in this system.

Referring to FIG. 1, because the transmission path 103 is a format defined by SMPTE, an output format of the digital video camera 101, and an input format of the external recorder 102 that receives it are configured to be adapted to a format defined by SMPTE. Even a plurality of different transmission formats can be easily and automatically identified by, for example, utilizing Payload ID defined by the SMPTE standard.

However, even if correct connection and transmission are realized in terms of the transmission format, in some cases, video data transmitted in that format, video data recorded by the external recorder 102, or video data processed by the computer system 106 does not necessarily meet an expected value.

For example, there occur such troubles that a center of a video image is not located at an actual center and an angle of view is shifted, continuity of a gradation is broken, data different from an expected value is contained, and data of temporally varying video frames are mixed. Further, in a case of Bayer RAW data, there occur such troubles that an arrangement of R, Gr, Gb, and B is changed into a different arrangement, and a portion beyond a resolution of a desired format is created, which leads to a lack of a marginal portion required at the time of the development from RAW data into RGB data or YCbCr data. (Note: In a case of a Bayer array, basically, the array is a two-dimensional lattice array such that Gr is G located next to R, and Gb is G located diagonally from Gr and next to B. R and B are in a diagonally located relationship.)

In the descriptions of the exemplary embodiments, methods for generating characteristic video signals will be described sequentially as methods for realizing easy detection of the above-described troubles and establishment of consistency with the expected value. A portion that generates the video signal is included in the digital video camera 101 illustrated in FIG. 1. Therefore, first, an overview of a system configuration of the digital video camera 101 will be described with reference to a block diagram illustrated in FIG. 2.

Figure 2:
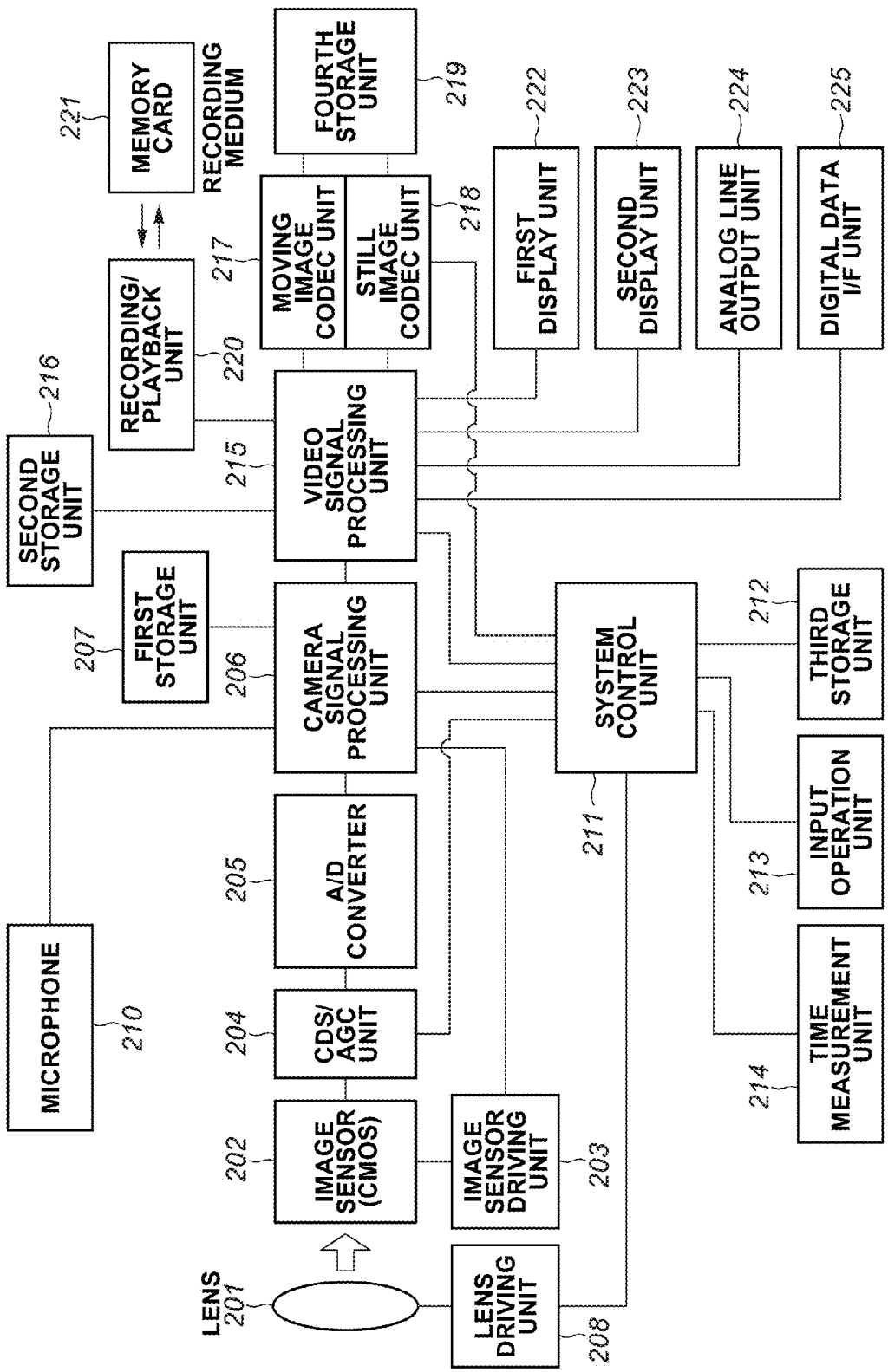
FIG. 2 is a block diagram illustrating an overview of a system configuration of a digital video camera as an example of an imaging apparatus according to a first exemplary embodiment of the present invention.

Referring to FIG. 2, a lens unit 201 constitutes an optical system configured to form an image of an object on an imaging surface of an image sensor 202, and has a zoom function, a focus adjustment function, and a diaphragm adjustment function that can work according to a user's manual operation. The image sensor 202 is configured in such a manner that a large number of photoelectric conversion elements are two-dimensionally arranged, and converts the optical image of the object formed by the lens unit 201 into a video signal pixel by pixel. The image sensor 202 may be, for example, a Complementary Metal Oxide Semiconductor (CMOS) image sensor, or a Charged Coupled Device (CCD) image sensor. Further, the image sensor 202 also has an electronic shutter function by adjusting a time during which the photoelectric conversion elements accumulate electric charges.

An image sensor driving unit 203 drives and controls the image sensor 202 according to a timing controlled by a camera signal processing unit 206. A correlation double sampling (CDS)/analog gain control (AGC) unit 204 reduces noises by performing correlation double sampling (CDS) on an analog video signal from the image sensor 202, and performs gain control on a signal level (AGC) under control of a system control unit 211. An Analog to Digital (A/D) converter 205 converts the analog video signal from the CDS/AGC unit 204 into a digital video signal, and supplies the converted signal to the camera signal processing unit 206. The CDS/AGC unit 204 may be included in the image sensor 202.

The camera signal processing unit 206 performs various kinds of correction processing such as generation of a timing signal, automatic exposure (Auto Exposure: AE) control, automatic focus (Auto Focus: AF) control, a white balance adjustment, and a gamma adjustment, in cooperation with the system control unit 211. When outputting RAW data that will be described below, the camera signal processing unit 206 outputs the video signal output from the image sensor 202 without performing a part or a whole of so-called development processing such as the above-described Debayer processing, white balance adjustment, and gamma adjustment.

The digital video camera 101 according to the present exemplary embodiment includes a first storage unit 207, a second storage unit 216, a third storage unit 212, and a fourth storage unit 219 according to intended use. For convenience of a description, the present exemplary embodiment is described assuming that the first storage unit 207, the second storage unit 216, the third storage unit 212, and the fourth storage unit 219 are individually provided for camera signal processing, video control, system control, and coders-decoders (CODECs), respectively. However, physically, these storage units may be realized by a same storage device. Typically, the first to fourth storage units 207, 216, 212, and 219 are embodied by writable and readable semiconductor memories, but at least one of them may be embodied by another storage device.

The first storage unit 207 is used by the camera signal processing unit 206 as, for example, a frame memory during execution of signal processing on a captured video image. The lens driving unit 208 can perform the adjustment of a zoom ratio, the focus adjustment, and the exposure adjustment by driving, for example, a not-illustrated motor and actuator of the lens unit 201 according to control of the system control unit 211, even without a user's manual operation. Further, on the other hand, the lens driving unit 208 also has a function of acquiring information such as a focal length based on a lens position and an opening degree of a diaphragm even when a user's manual operation is performed. The system control unit 211 controls the lens driving unit 208 based on a result of the signal processing by the camera signal processing unit 206. For example, during AF control, the system control unit 211 controls the lens driving unit 208 based on an AF evaluation value calculated by the camera signal processing unit 206, and drives and controls a focus adjustment lens of the lens unit 201, thereby focusing the lens unit 201 onto the object.

A microphone 210 is enabled when the digital video camera 101 records an ambient sound, and an audio signal from the microphone 210 is supplied to the camera signal processing unit 206. For example, when the digital video camera 101 records a sound from the microphone 210 together with a video image captured by the image sensor 202, the camera signal processing unit 206 supplies them to the video signal processing unit 215 after aligning their time axes to each other.

The system control unit 211 is, for example, a CPU, and controls a whole operation of the digital video camera 101 according to the present exemplary embodiment by executing a program stored in the third storage unit 212. The third storage unit 212 includes, for example, a read only memory (ROM) and/or a random access memory (RAM), and stores the program to be executed by the system control unit 211, various kinds of settings, an initial value, and the like. Further, the third storage unit 212 is also used as a work area of the system control unit 211.

An input operation unit 213 is a user interface that allows a person shooting a video image to provide an instruction to the digital video camera 101, and includes an input device such as a key and various kinds of operation buttons.

A time measurement unit 214 includes a real-time clock (RTC) and a backup battery, and returns date and time information in response to a request from the system control unit 211.

The video signal processing unit 215 performs control of a display onto a first display unit 222 and a second display unit 223, including adjustments of a hue, a saturation, and a luminosity, control of an output to an analog output unit 224, control of an output to a digital data interface (I/F) unit 225, control of a recording/playback unit 220, and the like. The video signal processing unit 215 also performs conversion of a resolution of a video signal for respective video output systems including the first display unit 222 and the second display unit 223, superimposition of a zebra pattern, and the like. Further, the video signal processing unit 215 also performs control of On Screen Display (OSD) such as displays of shooting information, a user setting menu, and a function button required for a touch panel operation. The second storage unit 216 is a storage unit for video control, and is used as a frame memory, a work memory, and the like when the video signal processing unit 215 performs signal processing regarding a video baseband signal.

A moving image codec unit 217 is a block configured to function as a moving image codec, which codes and decodes a moving image in compliance with H.264. The format for coding and decoding may be another format such as the Moving Picture Experts Group (MPEG)-2 format, H.265, and High Efficiency Video Coding (HEVC: high efficiency moving image compression coding). Similarly, a still image codec unit 218 is a block configured to function as a still image codec, which codes and decodes a still image in compliance with Joint Photographic Experts Group (JPEG). The format for coding and decoding therefor may be also another format such as JPEG 2000 and Portable Network Graphics (PNG). In the present exemplary embodiment, the still image codec unit 218 is connected to the video signal processing unit 215 to share a circuit with the moving image codec unit 217, and to realize a function of shooting a still image from a reproduced moving image (a capture function). However, the still image codec unit 218 may be directly connected to the camera signal processing unit 206. The fourth storage unit 219 is a storage unit for the codec, and is used when the moving image codec unit 217 and the still image codec unit 218 code and decode a video signal.

The recording/playback unit 220 records and reads out recording data, which is coded and is processed as a recording format by the video signal processing unit 215 and the moving image codec unit 217 or the still image codec unit 218, into and from a recording medium 221. The recording medium 221 is not limited to a memory card. Even if the recording medium 221 is a digital versatile disk (DVD), an optical disk having a further large capacity, a hard disk drive (HDD), a solid state drive (SSD), or the like, a recording/playback system adapted to each device can be constructed in its own way.

The first display unit 222 and the second display unit 223 are display devices, and both of them can display similar information. In the present example, suppose that the second display unit 223 is smaller than the first display unit 222, and is mounted within a finder. On the other hand, the first display unit 222 is a relatively large display device mounted on, for example, a side surface of a casing so as to be openable and closable. The digital video camera 101 can also include a touch panel or the like that cooperates with the system control unit 211 and the video signal processing unit 215, and enables selecting and controlling of an operation menu or the like displayed on a screen.

In a shooting mode, an auxiliary display such as a display of a shooting aspect frame, in addition to a video image input from the image sensor 202 and an enlarged video image, is displayed on these first and second display units 222 and 223. The first and second display units 222 and 223 each function as an electronic view finder (EVF) by sequentially displaying video images input from the image sensor 202.

On the other hand, in a playback mode, a moving image or a still image recorded in the recording medium 221 is displayed on the first and second display units 222 and 223. Further, information indicating an operation input by the person shooting a video image via the input operation unit 213, arbitrary image information (shooting information) in the memory card as the recording medium 221, and the like can be also displayed on the first and second display units 222 and 223.

The analog line output unit 224 is a group of interfaces such as an output of an analog component video signal, an output of an S terminal, and an output of a composite video signal. Connecting the analog line output unit 224 to an external monitor or the like allows a video output from the present digital video camera 101 to be displayed on the external monitor.

The digital data I/F unit 225 can arbitrarily include a digital interface such as USB, SDI, or HDMI (registered trademark). In the present example, the digital data I/F unit 225 includes a plurality of 3G-SDI output terminals.

Next, one example of an output format of a test video signal from the above-described camera signal processing unit 206 will be described with reference to FIG. 3. A test video signal generation unit in this example is included in the camera signal processing unit 206 together with the other functions.

Figure 3:
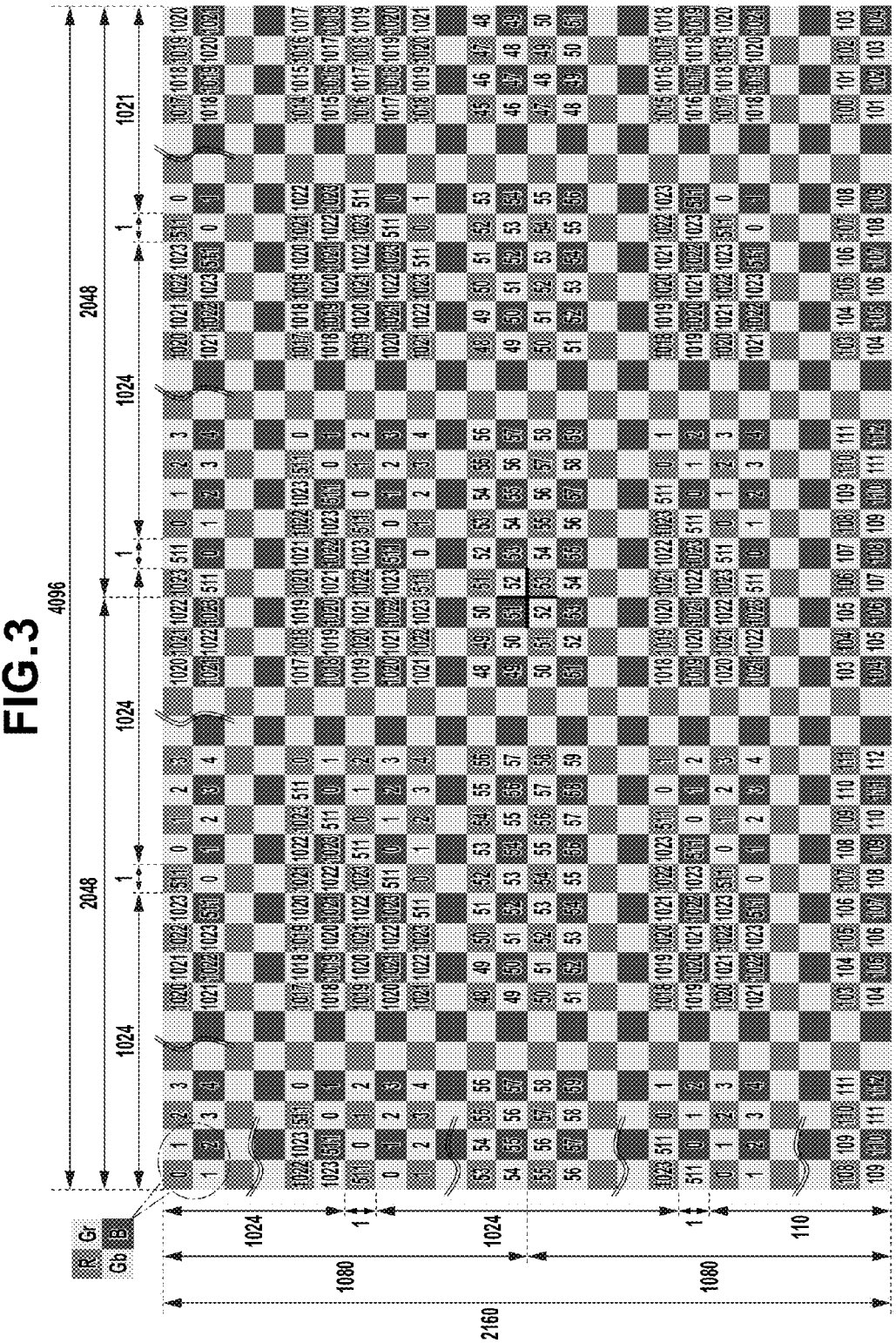
FIG. 3 illustrates an example of an output format of a test video signal from the digital video camera as an example of the imaging apparatus according to the first exemplary embodiment of the present invention.

As illustrated in FIG. 3, the RAW data output from the camera signal processing unit 206 is based on a predetermined format, in the present exemplary embodiment, based on an array of sensor pixels according to the Bayer RGB array in the present exemplary embodiment. More specifically, the Raw data has a two-dimensional array in which a combination of four R, Gr, Gb, and B pixels is repeated as illustrated in an upper left portion in FIG. 3, and the format (pixel array) of the test video signal has the following content.

Valid Pixels: Horizontal Number (Pixels)×Vertical Number (Lines)=4096×2160
Scan Direction: Horizontal Line
Start Reference: Start from R at Upper Left in Angle of View
Gradation: 10 Bits
Range: 0 to 1023 as Decimal Numbers In this range, a transmission range of SMPTE is ignored for simplification of a description.

Number of Pixels Inserted between Repetition Patterns: One Pixel
Value of Inserted Pixel: Middle Point between Preceding and Subsequent Pixels (rounded down to the closest whole number)
Amount of Data Shift between Lines: One Pixel to Left The format is configured in this manner, whereby, focusing on a first line in FIG. 3, one pattern is constructed starting from R, Gr, R, Gr . . . =0, 1, 2, 3 . . . , and ending with . . . R, Gr, R, Gr= . . . 1020, 1021, 1022, 1023. In other words, the test video signal according to the present exemplary embodiment has signal values of respective pixels that are set so as to exhaustively cover signal values within a predetermined range in an arbitrary direction of a video image of the test video signal, and includes a repetition pattern in the arbitrary direction of the video image of the test video signal.

The value of a next R pixel is not set to 0, and a single pixel having a value 511 (a middle point between 1023 and 0) is inserted there, whereby R pixels are prevented from constantly having an even number like 0, 2, 4 . . . . In other words, in the test video signal according to the present exemplary embodiment, a signal deviating from the regularity of the repetition pattern is inserted at a predetermined position in the repetition pattern.

Further, this insertion is also intended to smooth the continuity of the signals by using the middle point for the inserted pixel, thereby reducing generation of a transient response of the signal at the time of a display observation on a master monitor or the like. Because the number of pixels in the horizontal direction is 4096 pixels, the first horizontal line contains three repetitions of 1025 pixels, each of which is constituted by a combination of a ramp signal from 0 to 1023 and the single inserted pixel, and a ramp signal starting from last 0 has 1021 pixels, ending with 1020.

$$(1024+1) \times 3 + 1021 = 4096 \text{ pixels}$$

Next, focusing on a second line in FIG. 3, this line contains a pattern shifted to the left by one pixel from the first line. Because this is the Bayer RGB array, if the first line starts from R, the second line starts from Gb and has Gb, B, Gb, B . . . =1, 2, 3, 4 . . . . After that, the patterns are shifted to the left by one pixel for each line sequentially (the repetition patterns have different phases).

According to this arrangement, if this array is viewed vertically, for example, leftmost pixels in FIG. 3 start from R, Gb, R, Gb . . . =0, 1, 2, 3 . . . and ends with . . . R, Gb, R, Gb= . . . 1020, 1021, 1022, 1023, by which one pattern is constructed. In other words, in the test video signal according to the present exemplary embodiment, spatially or temporally adjacent repetition patterns have different phases from each other.

Further, a single pixel having the value 511 is also inserted in the vertical direction. Because the number of lines in the vertical direction is 2160, the first vertical line contains two repetitions of 1025 pixels, each of which is constituted by a combination of a ramp signal of 0 to 1023 and the single inserted pixel also when the array is viewed vertically, in a similar manner to the horizontal line. In other words, a ramp signal starting from last 0 has 110 pixels while ending with 109.

$$(1024+1) \times 2 + 110 = 2160 \text{ pixels}$$

The array is configured in this manner, by which the signal patterns are different between the upper end and the lower end, and the left end and the right end of the valid pixels, and not only the pixels at the end surfaces but also the inner consecutive pixels change cyclically, as seen from FIG. 3. As a result, the test video signal can ensure that a loss of a pixel and an unintended hold do not occur on an end surface of the image and there is no wraparound of data that is likely to occur due to unsynchronized signal processing timings, and conversely, allow easy confirmation if there is any trouble.

Further, as long as the continuity of the pattern is not broken, a center in the angle of view, which is indicated by a cross in FIG. 3, can be also guaranteed by correctness of the start pixel.

Further, when the array is viewed either horizontally or vertically, because different data patterns are set according to the pixel colors, no mixing among the pixel colors and no phase shift occur. Conversely, if there is any trouble, the test video signal can allow easy confirmation thereof, for example, an edge portion of the obliquely slanting ramp signal is colored in this case.

Even focusing on even-numbered positions and odd-numbered positions in the arrangement of the pixels, the even numbers and the odd numbers are not fixed and variable as data, whereby the test video signal can also allow easy confirmation of an inadequacy in address connection and control, and the like.

The repetition pattern has been described as a monotonous increase pattern incremented one by one within the range of 0 to 1023. However, the repetition pattern may also be a monotonous reduction pattern, or a variable pattern such as a pattern of 0-511 or 1023-512. If the test video signal is not intended to facilitate discovery of a large failure by a visual observation or the like, instead a digital comparison is performed with use of the computer system 106 and the like, the consistency can be maintained even with a random pattern or the like within the range.

Figure 5:
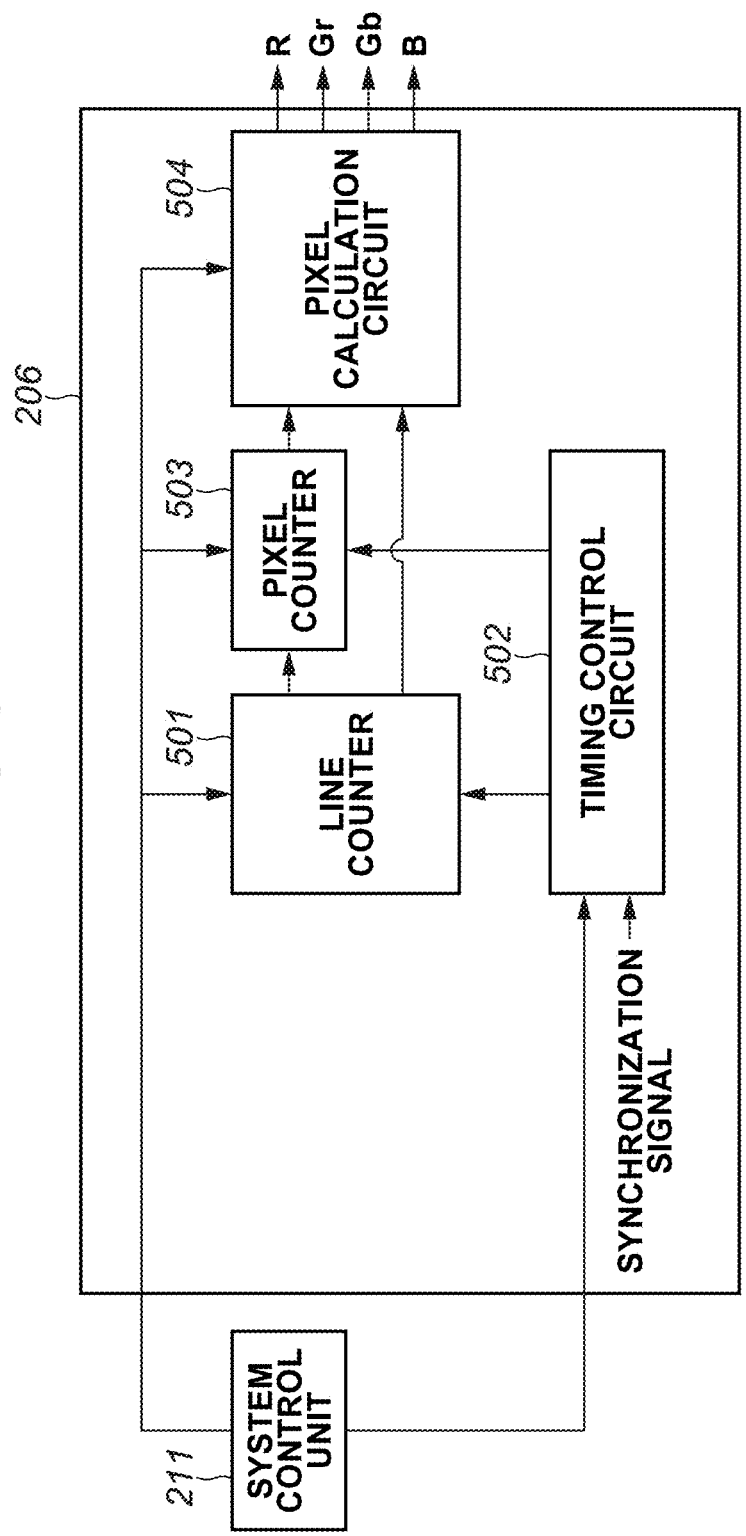
FIG. 5 is a block diagram illustrating test video signal processing that represents a characteristic of the first exemplary embodiment, in the digital video camera as an example of the imaging apparatus according to the first exemplary embodiment of the present invention.

Next, FIG. 5 illustrates examples of constituent blocks in a test video signal generation circuit. According to the present exemplary embodiment, the test video signal generation circuit is constituted by a part of the system control unit 211 and a part of the camera signal processing unit 206. The test video signal generation circuit generates R, Gr, Gb, and B by performing calculation processing from various kinds of counters, timings of which are controlled based on a synchronization signal of a video image, and counter values to generate the test video signal according to the Bayer array.

Test Video Signal

A line counter 501 counts the number of lines in a video image. The value of the line counter 501 is provided to a pixel counter 503 located at a subsequent stage, which counts the number of pixels. The pixel counter 503 located at the subsequent stage determines an initial vale in each line to control a value of a start pixel at a left end of the video image based on this line counter value.

A timing control circuit 502 receives a vertical synchronization signal and a horizontal synchronization signal of a video signal, a clock, and the like to control the line counter 501 and the pixel counter 503.

The pixel counter 503 increments the value based on a pixel clock of each line. The pixel counter 503 receives the line counter value from the line counter 501 to determine the initial value of the pixel counter 503, and provides the value of the pixel counter 503 to a pixel calculation circuit 504 located at a subsequent stage.

The pixel calculation circuit 504 arranges each of the R, Gr, Gb, and B pixels, which are constituent pixels of the Bayer RGB array, as the array described above with reference to FIG. 3, thereby generating the test video signal.

The system control unit 211 controls an operation of the timing control circuit 502 to adjust count steps and the like of the line counter 501 and the pixel counter 503, and to change the initial values thereof. Further, the system control unit 211 determines count ranges, and controls the number of data pieces and a value of data to be inserted at a range boundary or an arbitrary position. Further, the system control unit 211 controls an algorithm for calculating the constituent pixels of the Bayer RGB array, the respective R, Gr, Gb, and B pixels to be generated by the pixel calculation circuit 504 from a calculation. A part or a whole of the hardware illustrated in FIG. 5 may be realized by software processing to generate the test video signal.

Figure 4:
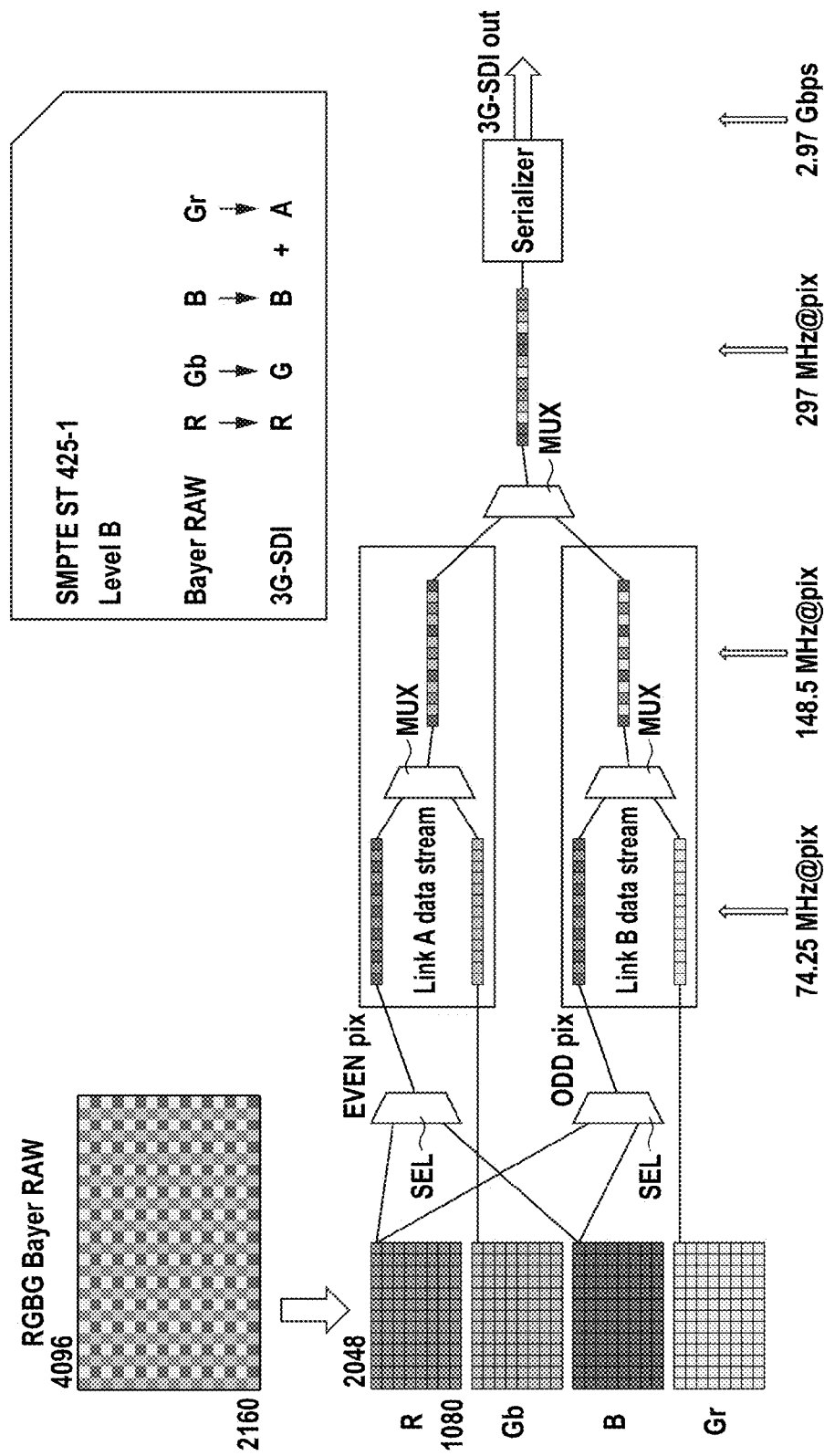
FIG. 4 is a conceptual diagram illustrating signal processing when the test video signal is output via SDI from the digital video camera as an example of the imaging apparatus according to the first exemplary embodiment of the present invention.

On the other hand, FIG. 4 illustrates a concept of processing when the test video signal data illustrated in FIG. 3 is transmitted via SDI. As illustrated in FIG. 4, focusing on each color pixel in the RAW data that has each pixel of 10 bits in Bayer RGrGbB at a valid resolution of 4096×2160, each of the R, Gr, Gb, and B pixels corresponds to 2048× 1080. This data can be transmitted by assigning R to R, Gr to A, Gb to G, and B to B in an RGB+A transmission standard of SMPTE ST 425-1 Level B. This video data transmitted via SDI is received by the external recorder 102 and is recorded into the recording medium 104. The data read out from the recording medium 104 by the computer system 106 or the like via the medium reader 105 is reconstructed into Bayer RGrGbB data, and is subjected to the development processing and the like if necessary. It is important that this reconstructed Bayer RGrGbB data matches the format intentionally output from the digital video camera 101. The present exemplary embodiment realizes a function of outputting the test video signal to verify that. Further, connecting the SDI transmission path to a general-purpose master monitor or the like allows the data to be visually observed as RGB (RGrGbB) video data. A large trouble or failure can be relatively easily found out because the test video signal has the regular pattern. Although not described in detail herein, transmission states of all Bayer RGrGbB color pixels can be confirmed even through a visual observation by preparing a mechanism for exchanging Gb and Gr.

Highly accurately and detailed verifying matching can be realized not only by a visual observation but also by a comparison of the reconstructed Bayer RGrGbB data with additionally prepared reference data created as an expected value in the external recorder 102 or the computer system 106.

As described above, for example, the following items can be confirmed as representative troubles regarding the angle of view and the pixel array, by using the test video signal according to the present exemplary embodiment.

a. Whether the center of the video image is not shifted.
b. Whether a loss and an unintended hold do not occur at the left and the right of the video image.
c. Whether a loss and an unintended hold do not occur at the top and the bottom of the video image.
d. Whether a wraparound does not occur at the left and the right of the video image.
e. Whether a wraparound does not occur at the top and the bottom of the video image.
f. Whether a mixing and a phase shift do not occur among the pixel constitute colors.
g. Whether there is no difference from the expected value in the even-numbered pixels and the odd-numbered pixels.

In other words, the test video signal according to the present exemplary embodiment is configured in consideration of the following points corresponding to the confirmation of the above-described items a to g.

a: The data is constructed according to the (regular) arrangement that uniquely determines the image center.

b and d: Data arrangements are different between the left end and the right end of the video image.

c and e: Data arrangements are different between the upper end and the lower end of the video image.

f: Data arrays are different among the pixel constituent colors (R, Gr, Gb, and B in the case of Bayer RGB) in signal processing.

g: Data pieces are different between adjacent even-numbered pixels and adjacent odd-numbered pixels in an arbitrary region.

In this manner, the present exemplary embodiment realizes the unique test video signal suitable for verification. As a result, it becomes possible to easily and highly accurately confirm that the video data matches the expected value at each of the digital video camera 101, the external recorder 102, and the computer system 106 with respect to format consistency by a visual observation or a data comparison.

Next, a second exemplary embodiment of the present invention will be described. A difference of the present exemplary embodiment from the first exemplary embodiment is that verification items that are taken into consideration as the configuration of the test video signal, relate to the gradation and the range.

An example of an output format of the test video signal from the digital video camera 101 illustrated in FIG. 2 will be described with reference to FIG. 6, in a similar manner to the first exemplary embodiment.

Figure 6:
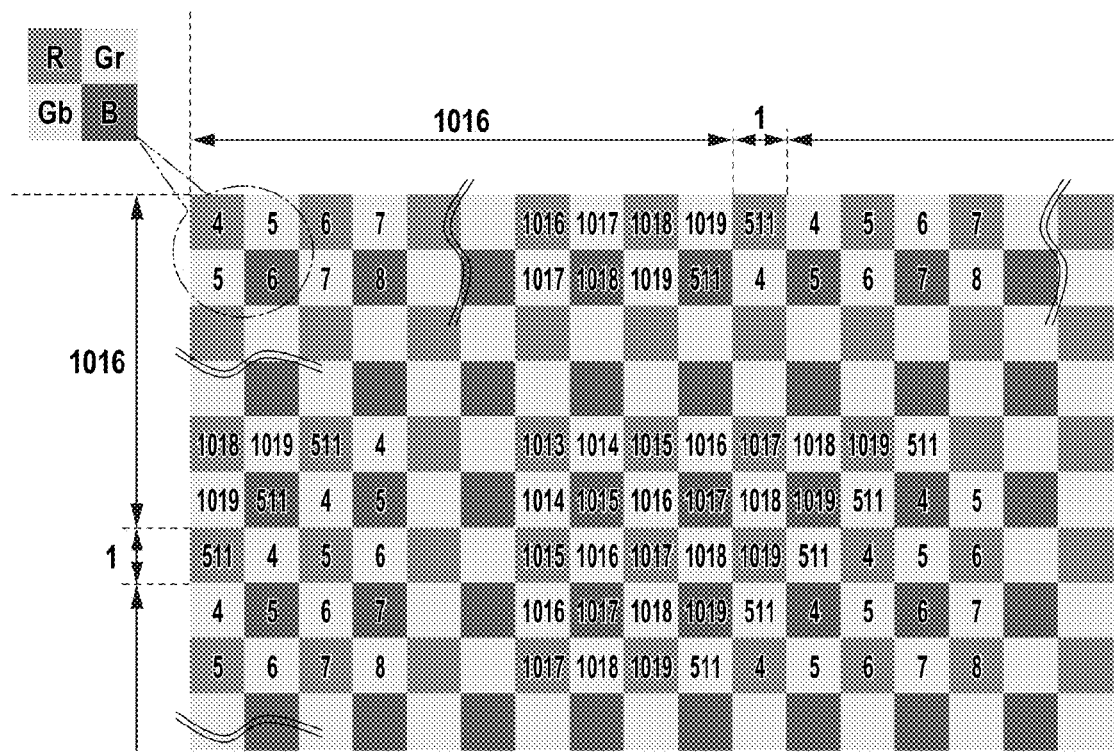
FIG. 6 illustrates an example of an output format of a test video signal from a digital video camera as an example of an imaging apparatus according to a second exemplary embodiment of the present invention.

Referring to FIG. 6, similarly, the RAW data is configured based on the array of sensor pixels according to the Bayer RGB array, and the format thereof has the following content.

Valid Pixels: Horizontal Number (Pixels)×Vertical Number (Lines)=4096×2160

Scan Direction: Horizontal Line

Start Reference: Start from R at Upper Left in Angle of View

Gradation: 10 Bits

Range: 4 to 1019 as Decimal Numbers

The range in this format is set so as to cover signal values in the transmission range except for an embedded sync code (a prohibition code) in the case of 10 bits, in consideration of the transmission range of SMPTE.

Number of Pixels Inserted between Repetition Patterns: One Pixel

Value of Inserted Pixel: Middle Point between Preceding and Subsequent Pixels (rounded down to the closest whole number)

Amount of Data Shift between Lines: One Pixel to Left

The range settable in the test video signal is different from the format illustrated in FIG. 3 according to the first exemplary embodiment, but the same idea is employed in terms of the regularity of the repetition pattern. A feature that should be focused on in the present exemplary embodiment is that, with respect to the gradation and the range, the signal values of the pixels cover all values as a signal level of a video signal settable in the transmission line path, and continuously change as a repetition pattern.

As described above, according to the present exemplary embodiment, for example, the following items can be confirmed as representative troubles regarding the gradation and the range, by using the test video signal according to the present exemplary embodiment.

h. Whether the gradation is maintained within the range.

i. Whether an exceedance over the range and an unexpected clip do not occur.

In other words, the test video signal according to the present exemplary embodiment is configured in consideration of the following points corresponding to the confirmation of the above-described items h and i.

h: The gradation exhaustively changes within an arbitrary range.

i: The gradation continuously changes.

In this manner, the present exemplary embodiment realizes the unique test video signal suitable for verification. As a result, it becomes possible to easily and highly accurately confirm that the video data matches the expected value at each of the digital video camera 101, the external recorder 102, and the computer system 106 with respect to format consistency by a visual observation or a data comparison.

Next, a third exemplary embodiment of the present invention will be described. A difference of the present exemplary embodiment from the first and second exemplary embodiments is that verification items that are taken into consideration as the configuration of the test video signal relate to a noise and a mask.

An example of an output format of the test video signal from the digital video camera 101 illustrated in FIG. 2 will be described with reference to FIG. 7, in a similar manner to the first and second exemplary embodiments.

Figure 7:
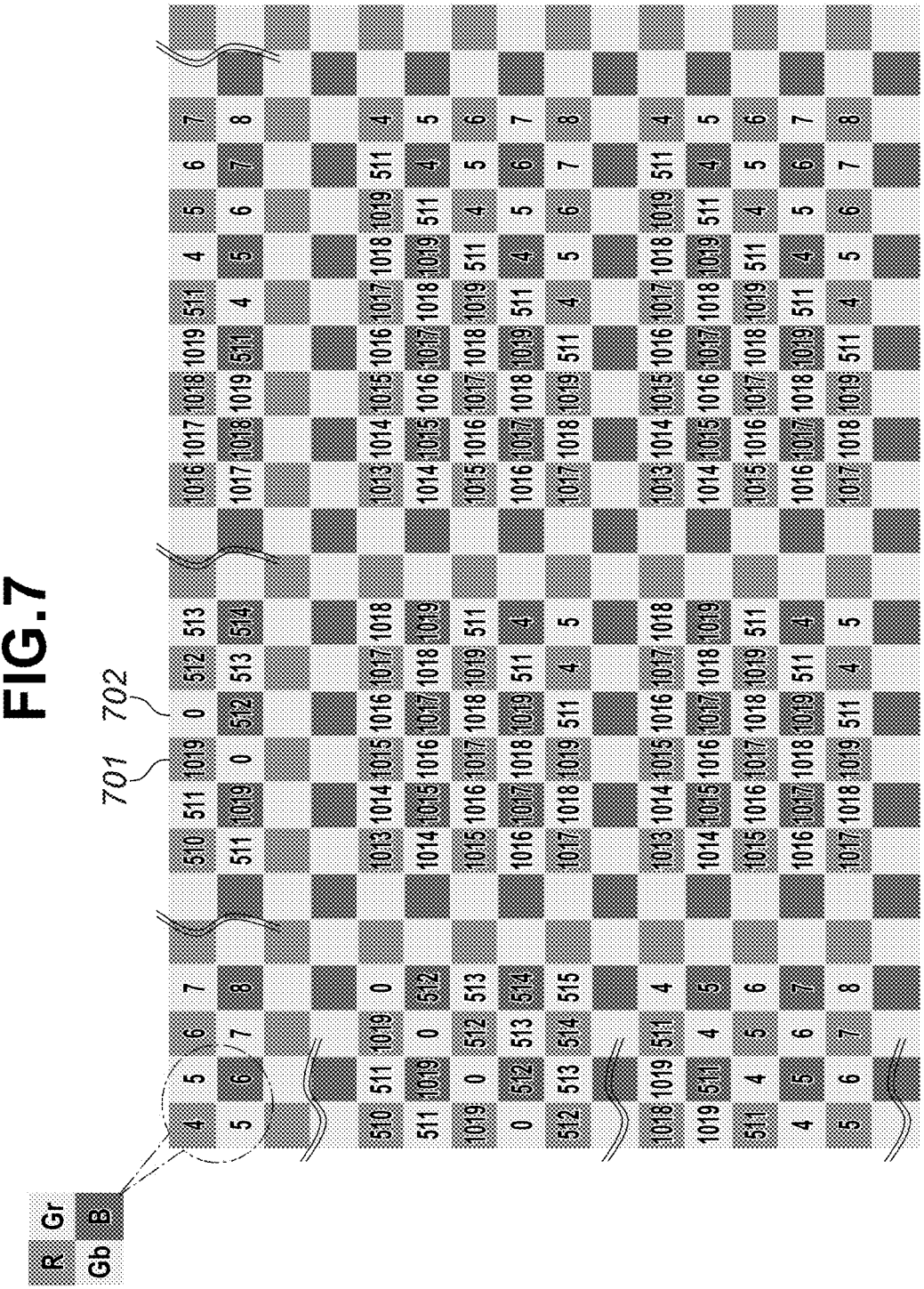
FIG. 7 illustrates an example of an output format of a test video signal from a digital video camera as an example of an imaging apparatus according to a third exemplary embodiment of the present invention.

Referring to FIG. 7, a difference from the format illustrated in FIG. 6 according to the second exemplary embodiment is that, while this format includes a ramp signal of 4 to 1019, for example, an R pixel 701 has a value of 1019 in the line of R and Gr as the first line. This means that, focusing on the R pixels, 1019 is inserted between 510 and 512 among the values changing from 4, 6 to 508, 510, 512, 514 to 1018. This insertion generates a singular point of the change.

A Gr pixel 702 has a value of 0. This means that, focusing on the Gr pixels, 0 is inserted between 511 and 513 among the values changing from 5, 7 to 509, 511, 513, 515 to 1019. This insertion generates a singular point of the change.

The above description is a description about the repetition pattern when the R pixels start with an even number. However, even if the Gr pixels start with an even number, the same idea can apply even if the R pixels and Gr pixels are exchanged. Further, the same idea can also apply to the line of Gb and B. The insertion position of the singular point, which has a drastically changed value while the values gradually change on coordinates of the video signal, is not limited to the above-described example and may be an arbitrary position. Further, an arbitrary value may be also selected as a level difference. It may be desirable that the singular point is repeatedly arranged in a monotonous or regular manner to prevent this point from being confused with a noise when it is observed visually.

As described above, according to the present exemplary embodiment, for example, the following items can be confirmed as representative troubles regarding a noise and a mask, by using the test video signal according to the present exemplary embodiment.

j. Whether data beyond the expected value as the test signal is not contained.

k. Whether there is no data lost due to a signal filter or a limiter.

In other words, the test video signal according to the present exemplary embodiment is configured in consideration of the following points corresponding to the confirmation of the above-described items j and k.

j: There is no singular point (noise) deviating from the regularity between preceding data and subsequent data or left data and right data within the range of the continuously and smoothly changing data array except for the predetermined point.

k: The singular point intentionally added (determined) into the test video signal in advance remains, keeping its original state.

In this manner, the present exemplary embodiment realizes the unique test video signal suitable for verification. As a result, it becomes possible to easily and highly accurately confirm that the video data matches the expected value at each of the digital video camera 101, the external recorder 102, and the computer system 106 with respect to format consistency by a visual observation or a data comparison.

Next, a fourth exemplary embodiment of the present invention will be described. A difference of the present exemplary embodiment from the first to third exemplary embodiments is that a verification item taken into consideration as the configuration of the test video signal relates to independence of a frame.

An example of an output format of the test video signal from the digital video camera 101 illustrated in FIG. 2 will be described with reference to FIG. 8, in a similar manner to the first to third exemplary embodiments.

Figure 8:
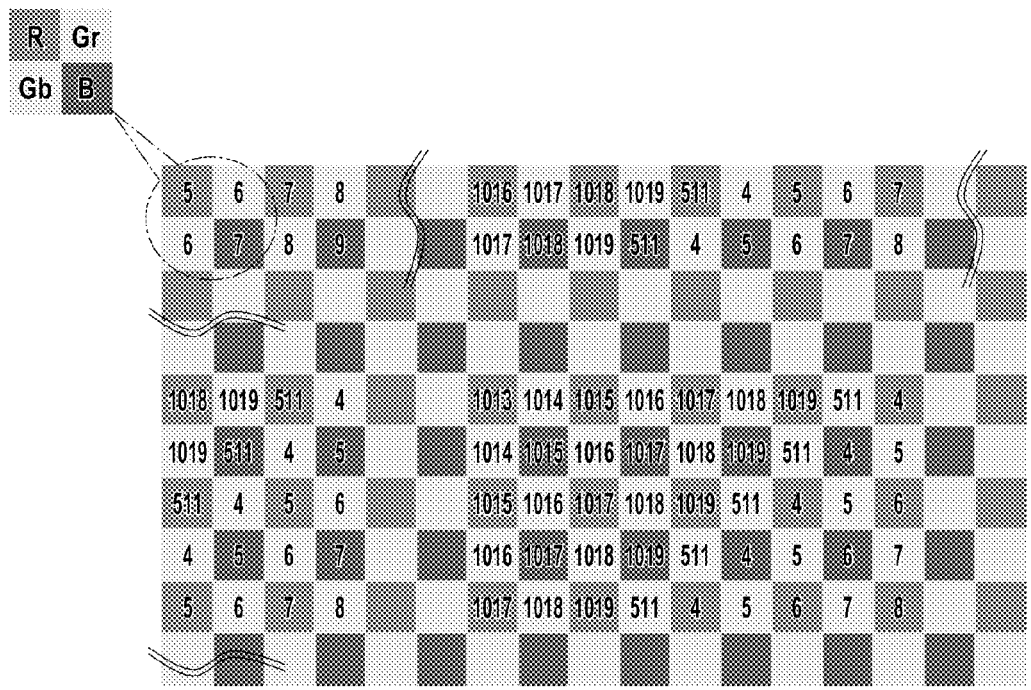
FIG. 8 illustrates an example of an output format of a test video signal from a digital video camera as an example of an imaging apparatus according to a fourth exemplary embodiment of the present invention.

Referring to FIG. 8, a difference from the format illustrated in FIG. 6 according to the second exemplary embodiment is that the value of the R pixel as the start pixel is "4" in FIG. 6 but "5" in FIG. 8. Therefore, compared to FIG. 6, the test video signal illustrated in FIG. 8 has a format shifted to the left by one pixel so that the single pixel at the left end is removed and a value maintaining the continuity of the repetition pattern is added at the right end. Then, for the test video signal of a plurality of consecutive frames, the test video signal can be configured so as to have a difference among the frames by sequentially incrementing the value of the start pixel one by one for each frame, and returning to a range lower limit once the value reaches a range upper limit.

As described above, according to the present exemplary embodiment, for example, the following item can be confirmed as a representative trouble regarding independence of a frame by using the test video signal according to the present exemplary embodiment.

m. Whether there is no mixing between data of a preceding frame and data of a subsequent frame.

In other words, the test video signal according to the present exemplary embodiment is configured in consideration of the following point corresponding to the confirmation of the above-described item m.

m: There is a difference between at least signal arrays formed by a preceding frame and a subsequent frame.

In this manner, the present exemplary embodiment realizes the unique test video signal suitable for verification. As a result, it becomes possible to easily and highly accurately confirm that the video data matches the expected value at each of the digital video camera 101, the external recorder 102, and the computer system 106 with respect to format consistency by a visual observation or a data comparison.

Next, a fifth exemplary embodiment of the present invention will be described. A difference of the present exemplary embodiment from the first to fourth exemplary embodiments is that verification items that are taken into consideration as the configuration of the test video signal relate to control of video data.

Examples of output formats of the test video signal from the digital video camera 101 illustrated in FIG. 2 will be described with reference to FIGS. 9A to 9E, in a similar manner to the first to fourth exemplary embodiments.

Figure 9C:
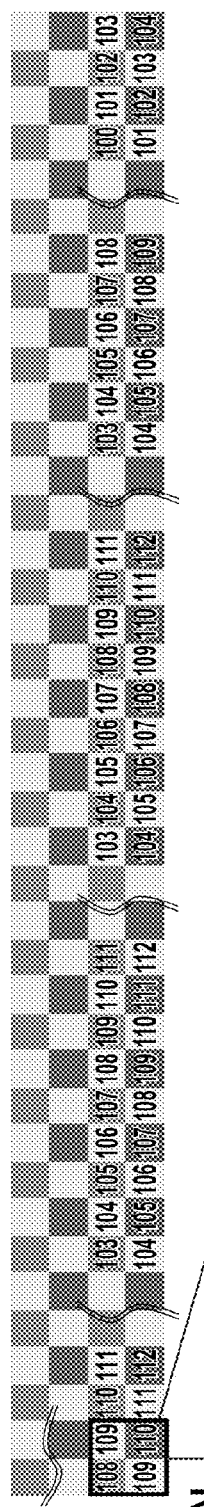

Among FIGS. 9A to 9E, FIG. 9A illustrates the data arrangement of the test video signal in the upper portion of the format illustrated in FIG. 3 according to the first exemplary embodiment. On the other hand, FIG. 9B illustrates an output state of the test video signal when the video image is reversed horizontally in the shooting mode of the digital video camera 101. Since the video image is reversed horizontally, for example, Bayer four pixels at an upper left end surrounded by a line defining a square in FIG. 9A come to a portion of Bayer four pixels at an upper right end surrounded by a line defining a square in FIG. 9B on the transmission path in the horizontally reversed state illustrated in FIG. 9B.

Figure 9D:
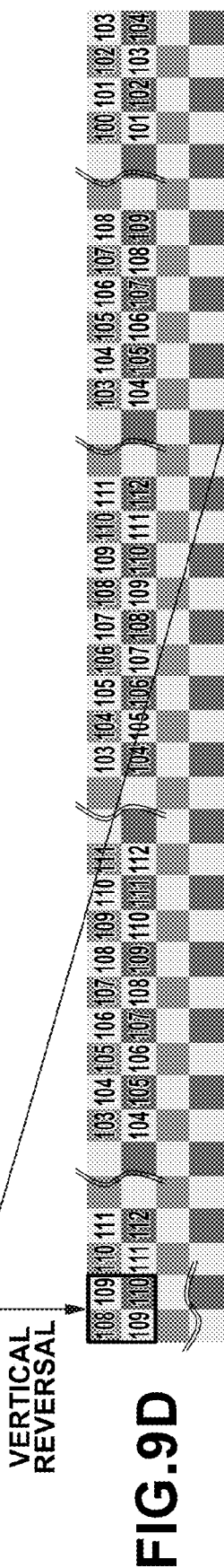

Similarly, focusing on a data arrangement when the video image is reversed vertically, FIG. 9C illustrates the data arrangement of the test video signal in the lower portion of the format illustrated in FIG. 3 according to the first exemplary embodiment. On the other hand, FIG. 9D illustrates an output state of the test video signal when the video image is reversed vertically in the shooting mode of the digital video camera 101. Since the video image is reversed vertically, for example, Bayer four pixels at a lower left end surrounded by a line defining a square in FIG. 9C come to a portion of Bayer four pixels at an upper left end surrounded by a line defining a square in FIG. 9D on the transmission path in the vertically reversed state illustrated in FIG. 9D.

Figure 9E:
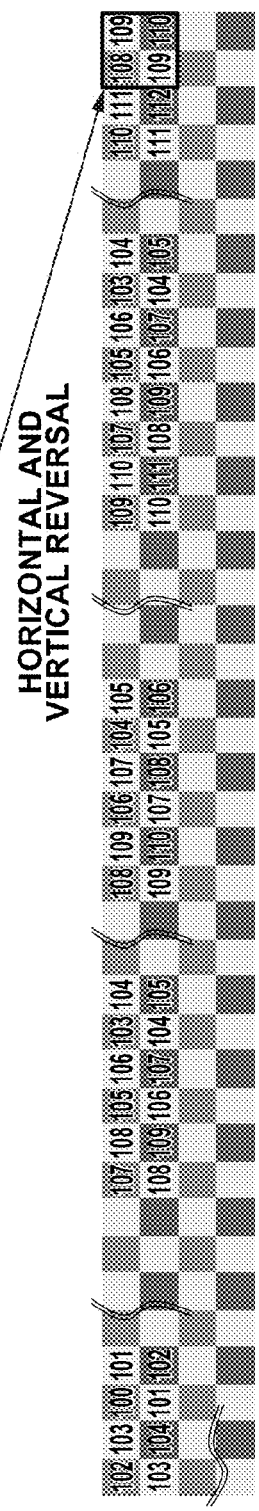

Further, focusing on a data arrangement when the video image is reversed horizontally and vertically, FIG. 9E illustrates an output state of the test video signal when the video image is reversed horizontally and vertically in the shooting mode of the digital video camera 101. Since the video image is reversed horizontally and vertically, for example, the Bayer four pixels at the lower left end surrounded by the line defining the square in FIG. 9C come to a portion of Bayer four pixels at an upper right end surrounded by a line defining a square in FIG. 9E on the transmission path in the horizontally and vertically reversed state illustrated in FIG. 9E.

The horizontal reversal, the vertical reversal, and the horizontal and vertical reversal are shooting modes mainly used at the time of three-dimensional shooting or the like, and are set by using a mechanism that notifies the external recorder 102 or the computer system 106 of the shooting state of the camera 101 through shooting meta information or the like, or by an manual operation. The head pixel among the Bayer R, Gr, Gb, and B valid pixels is the R pixel in normal shooting according to the present exemplary embodiment. On the other hand, in horizontal reversal shooting, signal processing should be performed at the external recorder 102 or the computer system 106 so that the Gr pixel becomes the head pixel among the valid pixels. In other words, if handling of the head pixel among the valid pixels is not changed in the above-described manner, the horizontal reversal does not result in a simple horizontal reverse of the arrangement illustrated in FIG. 9A but results in the horizontally shifted arrangement as illustrated in FIG. 9B because of the Bayer array. Similarly, processing for arranging Bayer R, Gr, Gb, and B pixels should be performed at the external recorder 102 or the computer system 106 so that the Gb pixel becomes the head pixel at the time of vertical reversal shooting and the B pixel becomes the head pixel at the time of horizontal and vertical reversal shooting.

On the other hand, considering a workflow, data outside a valid angle of view may be used when Bayer data is developed, because peripheral pixels existing beyond the valid angle of view after the development is performed can maintain development quality of the outer periphery of the valid angle of view. For example, when data beyond the angle of view defined by SMPTE is transmitted while being superimposed on an ancillary region of SDI as data, the test video signal according to the present exemplary embodiment can be also effectively utilized. When the pattern of the data (not illustrated) is configured so as to also include the outer peripheral portion (the marginal portion) of the valid angle of view, consistency of the Bayer RGrGbB format reconstructed in the external recorder 102 or the computer system 106 can be easily confirmed.

As described above, according to the present exemplary embodiment, for example, the following items can be confirmed as representative troubles regarding control of video data, by using the test video signal according to the present exemplary embodiment.

n. Whether the head pixel among the valid pixels is correctly handled (whether the head pixel is changed according to a change in the scan direction).

p. Whether peripheral pixels (the margin) outside a reference angle of view are correctly added.

In other words, the test video signal according to the present exemplary embodiment is configured in consideration of the following points corresponding to the confirmation of the above-described items n and p.

n: This item is same as the item f according to the first exemplary embodiment. Data arrays are different among the pixel constituent colors (R, Gr, Gb, and B in the case of Bayer RGB) in signal processing, and the data arrangement is horizontally and vertically asymmetric (so as to allow recognition of a change in a front image by the horizontal reversal, the vertical reversal, or the horizontal and vertical reversal).

p: Peripheral pixels outside the reference angle of view (defined by the SMPTE standard or the like) are data having continuity.

In this manner, the present exemplary embodiment realizes the unique test video signal suitable for verification. As a result, it becomes possible to easily and highly accurately confirm that the video data matches the expected value at each of the digital video camera 101, the external recorder 102, and the computer system 106, with respect to format consistency by a visual observation or a data comparison.

Next, a sixth exemplary embodiment of the present invention will be described. A difference of the present exemplary embodiment from the first to fifth exemplary embodiments is that verification items that are taken into consideration as the configuration of the test video signal relate to stepping, which is one of information for controlling a video signal.

An example of an output format of the test video signal from the digital video camera 101 illustrated in FIG. 2 will be described with reference to FIG. 10, in a similar manner to the first to fifth exemplary embodiments.

Figure 10:
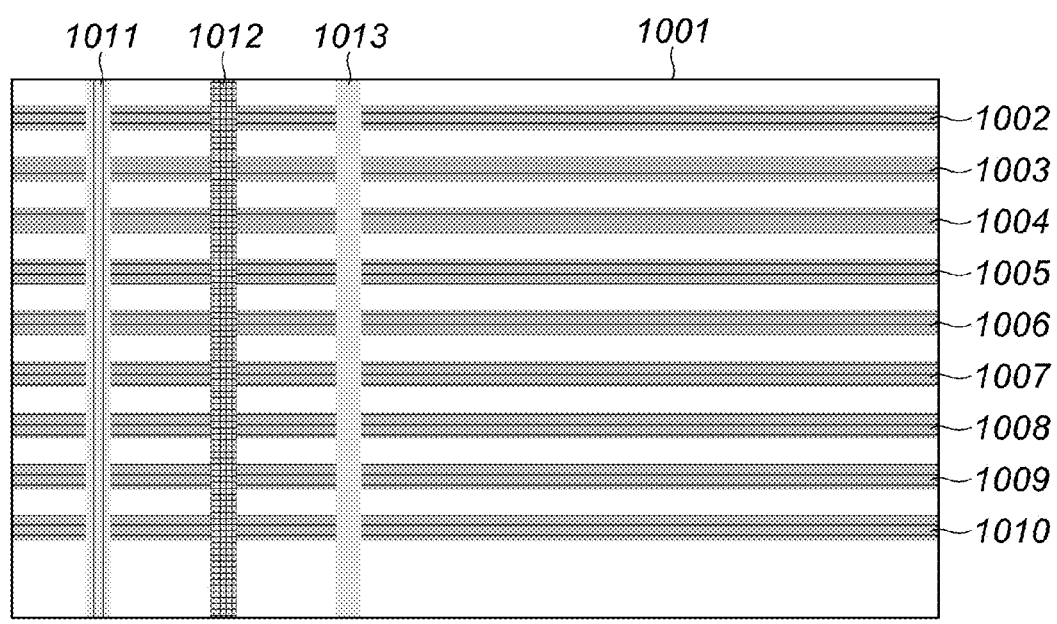
FIG. 10 illustrates an example of an output format of a test video signal from a digital video camera as an example of an imaging apparatus according to a sixth exemplary embodiment of the present invention.

Referring to FIG. 10, a frame 1001 indicates the angle of view in the test data. Indices 1002 to 1010 are linked with a time code (superimposed on SDI) defined by SMPTE 12M, and are replaced with the image while being linked with a ones digit of a frame number of the time code. If the ones digit of the frame number of the time code is 0, the indices 1002 to 1010 are not superimposed. If the ones digit is 1, the index 1002 is superimposed. If the ones digit is 2, the indices 1002 and 1003 are superimposed. The indices 1002 to 1010 are superimposed according to the number of the ones digit sequentially. The indices 1002 to 1010 linked with the time code, which are superimposed on each frame, are also meaningful because these indices are superimposed on coordinates according to the time code. This superimposition allows a user to intuitively confirm a time code corresponding to a current frame and continuity of time codes, by both a visual observation and a digital comparison using an evaluation tool.

Similarly, indices 1011 and 1012 are linked with the time code, and are replaced with the image while being linked with a tens digit of the frame number of the time code. If the tens digit of the frame number of the time code is 0, the indices 1011 and 1012 are not superimposed. If the tens digit is 1, the index 1011 is superimposed. If the tens digit is 2, the indices 1011 and 1012 are superimposed.

An index 1013 is also linked with the time code. The index 1013 indicates a state of a frame flag, which is used when the frame number substantially exceeds 59 which is counted from 0 such as a first frame 0 and a second frame 0, in a case where the frame number of the time code exceeds 29 which is counted from 0. If the frame flag is 0, the index 1013 is not superimposed. If the frame flag is 1, the index 1013 is superimposed.

A configuration of a circuit for generating the test video signal according to the present exemplary embodiment is similar to the configuration illustrated in FIG. 5 according to the first exemplary embodiment, and the pixel calculation circuit 504 controls a display of each of the indices 1002 to 1010 based on the time code under the control of the system control unit 211. As a display position, a horizontal position is determined where superimposition is performed on the video image from the counter value of the pixel counter 503. The indices 1011 to 1013 are displayed in a similar manner. As a display position, a vertical position is determined where superimposition is performed on the video image from the counter value of the line counter 501, based on the time code and a field flag, under the control of the system control unit 211. The field flag is a field identification flag described in SMPTE 12M, which assists in counting the time code over 29.

The data linked with the time code is added to the video image of the test video signal itself, whereby the present exemplary embodiment is different from a specification that performs mere OSD superimposition based on ancillary information of the time code or the like on a master monitor. The test video signal according to the present exemplary embodiment allows confirmation of a correct frame stepping state and the linkage with the time code as video output data of the camera 101.

As described above, according to the present exemplary embodiment, for example, the following items can be confirmed as representative troubles regarding stepping by using the test video signal according to the present exemplary embodiment.

q. Whether the video image is correctly updated on the temporal axis (whether data is not mixed between a preceding frame and a subsequent frame).

r. Whether the time code and the video image are synchronized as expected.

In other words, the test video signal according to the present exemplary embodiment is configured in consideration of the following points corresponding to the confirmation of the above-described items q and r.

q and r: The indices that changes corresponding to the time code added to the test video signal are superimposed on the video image of the test video signal.

In this manner, the present exemplary embodiment realizes the unique test video signal suitable for verification. As a result, it becomes possible to easily and highly accurately confirm that the video data matches the expected value at each of the digital video camera 101, the external recorder 102, and the computer system 106 with respect to format consistency by a visual observation or a data comparison.

Next, a seventh exemplary embodiment of the present invention will be described. A difference of the present exemplary embodiment from the first to sixth exemplary embodiments is that verification items that are taken into consideration as the configuration of the test video signal relate to a valid flag and a start/stop flag, which are information for controlling a video signal.

An example of an output format of the test video signal from the digital video camera 101 illustrated in FIG. 2 will be described with reference to FIG. 11, in a similar manner to the first to sixth exemplary embodiments.

Figure 11:
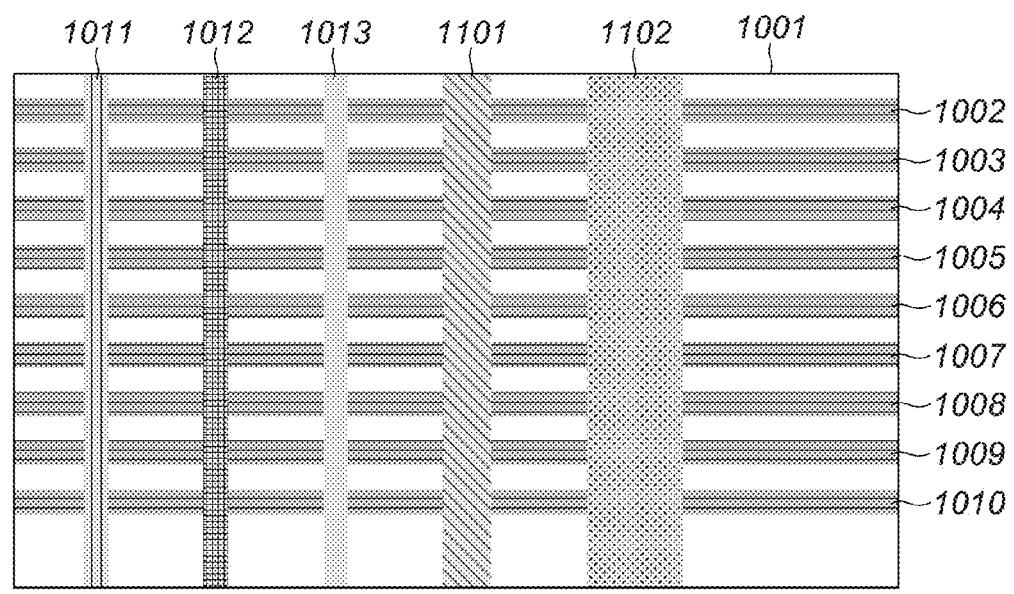
FIG. 11 illustrates an example of an output format of a test video signal from a digital video camera as an example of an imaging apparatus according to a seventh exemplary embodiment of the present invention.

Referring to FIG. 11, an index 1101 is linked with a valid flag, and is superimposed according to a state of the user-defined valid flag that indicates a valid video image or an invalid video image. The valid flag is a flag that indicates, for example, a valid frame as 24p in video data created by converting 24p to 30p by 2:3 pull-down, or a valid frame when a variable frame rate is used. The valid flag is set to 0 for a valid video image. If the valid flag is 0, the index 1101 is not superimposed. If the valid flag is 1, the index 1101 is superimposed. Thus, it can be easily confirmed that control is performed based on the valid flag so as to record only a valid video image by the external recorder 102. Accordingly, the system is set not to record an unnecessary video image. In other words, if the index 1101 is included in recorded data, there is an inadequacy in the control.

An index 1102 is linked with a Rec Start/Stop flag, which is ancillary information for controlling a start of recording (recording ongoing) and a stop of recording (recording standby) by the external recorder 102. For example, in order to start recording (recording ongoing), the index 1102 is superimposed. At the time of stopping the recording (recording standby), the index 1102 is not superimposed.

A configuration of a circuit for generating the test video signal according to the present exemplary embodiment is similar to the configuration illustrated in FIG. 5 according to the first exemplary embodiment, and a pixel calculation circuit portion controls a display of the index 1101 based on the valid flag synchronized with video management under the control of the system control unit 211. As a display position, a horizontal position where the index 1101 is superimposed on the video image is determined based on the counter value of the pixel counter 503. Further, the pixel calculation circuit portion controls a display of the index 1102 according to the Rec Start/Stop flag that is the ancillary information under the control of the system control unit 211. As a display position, a horizontal position where the index 1102 is superimposed on the video image is determined from the counter value of the pixel counter 503.

As described above, according to the present exemplary embodiment, for example, the following items can be confirmed as representative troubles regarding video control, by using the test video signal according to the present exemplary embodiment.

s. Whether the video image is correctly recorded by valid flag control.

t. Whether the video image is correctly recorded by start/stop flag control.

In other words, the test video signal according to the present exemplary embodiment is configured in consideration of the following points corresponding to the confirmation of the above-described items s and t.

s: Data indicating a valid video image or an invalid video image is added to the video image of the test video signal while being linked with the ancillary data information.

t: Data indicating that recording is in progress or on standby is added to the video image of the test video signal while being linked with the ancillary data information.

As described above, the present exemplary embodiment realizes the unique test video signal suitable for verification. As a result, it becomes possible to easily and highly accurately confirm that the video data matches the expected value at each of the digital video camera 101, the external recorder 102, and the computer system 106 with respect to format consistency, by a visual observation or a data comparison.

FIG. 12 illustrates an example of a verification workflow utilizing the test video signals according the above-described respective exemplary embodiments. Respective steps in this flow are performed in any of the digital video camera 101, a master monitor/waveform monitor, the external recorder 102, and the computer system 106.

In step S1201, the verification operation flow starts.

In step S1202, the system control unit 211 of the digital video camera 101 receives a selection of the shooting mode. This selection should be either a selection of a normal mode in which shot data is output from the image sensor 202, or a selection of a mode in which the test video signal data is output. The preset example will be described below assuming that the test mode for outputting the test video signal data is selected, but even in the case of the selection of the normal mode, also the respective steps are followed that will be described below. However, steps S1215 and S1216 are a digital comparison and a result display which are useful for the test video signal.

In step S1203, the system control unit 211 of the digital video camera 101 receives a selection of the scan mode. In this selection, it is determined whether to output the video image without performing a reversal operation while keeping an original state, whether to output the video image while horizontally reversing it, whether to output the video image while vertically reversing it, or whether to output the video image while horizontally and vertically reversing it.

In step S1204, the system control unit 211 of the digital video camera 101 receives a selection of a frame rate (frames per second (fps)) of the video signal. Frame rates 23.98 fps, 24.00 fps, 29.97 fps, 25.00 fps, 50.00 fps, 59.94 fps, 60.00 fps, and the like can be selected according to intended use.

In step S1205, the system control unit 211 of the digital video camera 101 receives a selection of a variable frame rate of the digital video camera 101.

As default, the digital video camera 101 captures the video image according to the frame rate selected in step S1204.

The valid flag, which is used to distinguish between a valid video frame at a timing corresponding to the frame rate set by the variable frame rate and other invalid video frames, is determined in the video signal output from the digital video camera 101. Then, this flag is added to the video image as ancillary information on the transmission path 103 such as SDI, and a mechanism for detecting this valid flag is provided in the external recorder 102 or the like on a receiving side. In this manner, a mechanism that records only a valid video frame in the recording medium 104 is realized.

The shooting mode, the scan mode, the frame rate, and the variable frame rate, the selections of which are received in the above-described steps S1202 to 1205, may be selected by a user's operation. Further, the shooting mode, the scan mode, the frame rate, and the variable frame rate may be automatically selected by the digital video camera 101 according to a shooting condition, an image analysis, and the like.

In step S1206, the digital video camera 101 generates the test video signal or reads out the test video signal from a memory (for example, the first storage unit 207), and stores the generated or read test video signal in a frame memory area of the first storage unit 207, which obtains RAW data from the image sensor 202 in the normal mode. By storing the test video signal in this frame memory area, the digital video camera 101 can handle, for example, reversal of a readout image according to the scan mode selected in step S1203 in a similar manner to a video signal in the normal mode. After that, the digital video camera 101 converts the test video signal into a format complying with the transmission standard. In the present example, the digital video camera 101 generates the test video signal according to Bayer RGrGbB, which is the format of a video signal output from the image sensor 202, or reads out the test video signal from the memory, and then converts the format of the generated or read test video signal as illustrated in FIG. 4 to transmit it through RGB+A of the SDI transmission path 103.

In step S1207, a shooting start button of the digital video camera 101 is operated, and the recording start/stop flag is added to the video image as the user-defined ancillary information on the transmission path 103 such as SDI, in a similar manner to the valid flag. A mechanism for detecting this recording start/stop flag is provided in the external recorder 102 or the like on the receiving side. In this manner, a mechanism for controlling recording of the video image in the recording medium 104 is realized.

In step S1208, an output from the digital video camera 101 can be displayed on the master monitor, the waveform monitor, or the like via the transmission path 103 such as SDI. Thus, the state of the video signal to be output to the external recorder 102 can be confirmed.

In step S1209, the external recorder 102 receives the video image output from the digital video camera 101 via the transmission path 103 such as SDI, and controls recording of the video image in the recording medium 104.

In step S1210, the external recorder 102 receives, for example, a recording medium detachment operation from a user to detach the recording medium 104 from the external recorder 102, and then ejects the recording medium 104.

In step S1211, the medium reader 105 accepts insertion of the recording medium 104.

In step S1212, the computer system 106 reads the video data recorded in the recording medium 104 in the connected medium reader 105.

In step S1213, the computer system 106 reconstructs the read video data into the Bayer RGrGbB format. At this time, the computer system 106 performs the signal processing while switching over the readout first pixel, according to the scan mode of the digital video camera 101, which is selected in step S1203, as necessary.

In step S1214, the computer system 106 displays the video image on a monitor. The user can confirm the test video signal on this monitor, and can confirm the consistency described in the above-described respective exemplary embodiments by a visual observation.

In step S1215, the computer system 106 digitally compares the Bayer RGrGbB data reconstructed in step S1213 with the predetermined expected value as the format of the test video signal, with use of a special application in the computer system 106. The computer system 106 notifies the user of OK if they match each other, or NG if they do not match each other. This digital comparison allows the user to confirm even a trouble on a level unrecognizable by a visual observation.

In step S1216, the computer system 106 visually displays a difference between the data pieces compared in step S1215. In this manner, the computer system 106 can provide a key to an analysis to identify how the test video signal does not match the expected value while the test video signal should normally match the expected value.

In step S1217, the verification operation flow ends.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-105459 filed May 17, 2013 and No. 2013-105460 filed May 17, 2013 which are hereby incorporated by reference herein in their entirety.

What is claimed is:

1. An imaging apparatus comprising:
   an imaging unit having a predetermined pixel array; and
   a generation unit configured to generate a test video signal
      for evaluating consistency between a video signal generated by performing predetermined processing on a video signal output from the imaging unit, and the video signal output from the imaging unit,
   wherein, in the test video signal, a signal value of each pixel is set so as to exhaustively cover signal values within a predetermined range of a signal value in a direction in a video image of the test video signal,
   wherein a signal value of the test video signal has a repetition pattern, which exhaustively covers signal values within the predetermined range of a signal value, in the direction in the video image of the test video signal, and
   wherein the spatially or temporally adjacent repetition patterns of signal values have different phases from each other.

2. The imaging apparatus according to claim 1, wherein, in the test video signal, data arrangements are different in a left end and a right end of the video image, and data arrangements are different in an upper end and a lower end of the video image.

3. The imaging apparatus according to claim 1, wherein, in the test video signal, data arrays are different between pixel constituent colors of an image sensor of the imaging unit.

4. The imaging apparatus according to claim 1, wherein, in the test video signal, data is different between adjacent even-numbered pixels and odd-numbered pixels.

5. The imaging apparatus according to claim 1, wherein, in the test video signal, the repetition pattern is configured so as to exhaustively cover signal values of a level within a range defined in the video signal output from an output unit.

6. The imaging apparatus according to claim 1, wherein the test video signal has a horizontally and vertically asymmetric data arrangement.

7. The imaging apparatus according to claim 1, wherein the predetermined pixel array is a Bayer array in which R, G, and B are pixel constituent colors.

8. The imaging apparatus according to claim 1, wherein the imaging apparatus has a normal mode in which the imaging apparatus outputs the video signal captured by the imaging unit, and a test mode in which the imaging apparatus outputs the test video signal.

9. The imaging apparatus according to claim 1, wherein the generation unit generates each signal value in the test video signal based on a line counter configured to count the number of lines in the test video signal, a pixel counter configured to count the number of pixels in the test video signal, and count steps of the line counter and the pixel counter.

10. A system comprising:
an imaging apparatus including an imaging unit having a predetermined pixel array, and
a generation unit configured to generate a test video signal for evaluating consistency between a video signal generated by performing predetermined processing on a video signal output from the imaging unit, and the video signal output from the imaging unit,
wherein, in the test video signal, a signal value of each pixel is set so as to exhaustively cover signal values within a predetermined range in a direction in a video image of the test video signal,
wherein the test video signal has a repetition pattern in, which exhaustively covers signal values with the predetermined range of a signal value, the direction in the video image of the test video signal, and
wherein the spatially or temporally adjacent repetition patterns have different phases from each other; and
an image processing apparatus including an evaluation unit configured to evaluate the consistency between the video signal generated by performing the predetermined processing on the video signal output from the imaging unit, and the video signal output from the imaging unit.

11. A method for controlling an imaging apparatus including an imaging unit having a predetermined pixel array, the method comprising:
generating a test video signal for evaluating consistency between a video signal generated by performing predetermined processing on a video signal output from the imaging unit, and the video signal output from the imaging unit,
wherein, in the test video signal, a signal value of each pixel is set so as to exhaustively cover signal values within a predetermined range in a direction in a video image of the test video signal,
wherein the test video signal has a repetition pattern, which exhaustively covers signal values within the predetermined range of a signal value, in the arbitrary direction in the video image of the test video signal, and
wherein the spatially or temporally adjacent repetition patterns have different phases from each other.

12. A method for controlling an imaging apparatus including an imaging unit having a predetermined pixel array, the method comprising:
outputting a test video signal for evaluating consistency between a video signal generated by performing predetermined processing on a video signal output from the imaging unit, and the video signal output from the imaging unit,
wherein, in the test video signal, a signal value of each pixel is set so as to exhaustively cover signal values within a predetermined range in a direction in a video image of the test video signal,
wherein the test video signal has a repetition pattern, which exhaustively covers signal values within the predetermined range of a signal value, in the direction in the video image of the test video signal, and
wherein the spatially or temporally adjacent repetition patterns have different phases from each other.

13. The system according to claim 10, further comprising a master monitor configured to display the video signal output from an output unit of the imaging apparatus.

14. The imaging apparatus according to claim 1, wherein, in the test video signal, a signal deviating from regularity of the repetition pattern is inserted at a predetermined position in the repetition pattern.

* * * * *